June 27, 1967   L. S. GAUMER, JR   3,327,489
METHOD FOR SEPARATING GASEOUS MIXTURES
Filed July 18, 1963   2 Sheets-Sheet 1

FIG.1

*INVENTOR.*
LEE S. GAUMER, JR.
BY Shanley & O'Neil
*ATTORNEYS.*

United States Patent Office 3,327,489
Patented June 27, 1967

3,327,489
METHOD FOR SEPARATING GASEOUS MIXTURES
Lee S. Gaumer, Jr., Allentown, Pa., assignor to Air Products and Chemicals, Inc., a corporation of Delaware
Filed July 18, 1963, Ser. No. 296,122
17 Claims. (Cl. 62—29)

This application is a continuation-in-part of application Ser. No. 97,323, filed Mar. 21, 1961, for "Method and Apparatus for Separating Gaseous Mixtures," now abandoned.

This invention relates to the separation of gaseous mixtures and more particularly to methods of and apparatus for fractionating gaseous mixtures under low temperature.

The power required to effect separation of gaseous mixtures includes the thermodynamic work of separation and an energy loss represented by the irreversibility of the processes required for the separation, such as the compression and fractionation processes. The irreversibility of the compression process constitutes a major portion of such energy loss while the irreversibility of the fractionation process comprises more than fifty percent of the energy loss due to irreversibility of the low temperature processes. The provision of a fractionation process which operates in a more reversible manner would not only reduce energy losses due to irreversibility of the low temperature fractionation processes but would decrease the required work of compression and thereby substantially reduce energy loss due to the irreversibility of the compression process.

The desirability of decreasing the irreversibility of the fractionating process has been appreciated in the past and theoretical studies have been made on ideal, reversible columns operating under hypothetical situations. Also, low temperature fractionating cycles have been proposed in which there is simultaneous heat and mass transfer between fractionating zones under different pressures with the view toward reducing the irreversibility of the fractionating process. In order to obtain the simultaneous transfer of heat and mass such cycles require unique, structurally complicated apparatus to form the fractionating columns. It is not known that such unique fractionating columns have been constructed and operated and there is a question with respect to their practicability and reliability. In any event, the complexity of the unique structures required would present serious manufacturing problems requiring a substantial capital investment as compared to conventional column structures, as well as maintenance problems, and the advantages gained by reduced power requirements would be materially nullified.

It is an object of the present invention to provide a novel method of and apparatus for separation of gaseous mixtures which reduces the irreversibility of the fractionation process to the degree theoretically obtainable by prior cycles without employing unique, structurally complicated apparatus, but by the novel use of well-known components employed in conventional low temperature separation cycles.

Conventional two-stage cycles such as employed for the separation of air into oxygen and nitrogen components include first and second fractionating zones operating under different pressures. In such cycles, one fractionating zone operates under superatmospheric pressure substantially corresponding to the pressure of the air feed and the second fractionating zone operates under lower pressure several pounds in excess of atmospheric pressure to insure flow from the cycle of product gases. The air feed undergoes preliminary separation in the fractionating zone under high pressure producing a liquid fraction consisting of crude oxygen and a gaseous fraction comprising substantially pure nitrogen, and the crude oxygen is fed to the low pressure fractionating zone where the separation is completed producing liquid oxygen component collecting in the base of the low pressure fractionating zone and gaseous nitrogen component withdrawn from the top of the column. The liquid oxygen and the high pressure nitrogen gas are brought into heat exchange effecting relation, by means of a condenser-evaporator which may form an integral part of the overall column structure joining the upper end of the high pressure fractionating column to the low end of the low pressure fractionating column or may comprise a two-pass heat exchange device referred to as an outside reboiler physically located apart from the high pressure column and the low pressure column except for the required piping connections. The heat interchange between the liquid oxygen and the high pressure nitrogen gas results in vaporization of liquid oxygen to provide reboil for the low pressure fractionating column and product gas while effecting liquefaction of the high pressure nitrogen which is used as reflux for the high pressure and the low pressure columns. The nitrogen is under high pressure relative to the oxygen because of the difference in the boiling points of oxygen and nitrogen and the pressure differential must be sufficiently great so that the heat interchange results in the degree of reboil and reflux production for efficient column operation. The air feed to the cycle is compressed to at least the pressure existing in the high pressure fractionating column and hence the power requirements of the conventional two-stage fractionating cycle are determined in part by the required operating pressure of the high pressure column established by the reboil and reflux requirements which relate to the degree of irreversibility of the fractionating process.

In a copending application of Lee S. Gaumer, Jr., Ser. No. 51,847, filed Aug. 25, 1960, for "Method and Apparatus for Separating Gaseous Mixtures," now Patent No. 3,210,951, there is disclosed an improved cycle having two stages or zones of fractionation under different pressures and including two reboilers or condenser-evaporators. Both of the reboilers are interconnected with the stages of fractionation in such a manner as to effect the required reboil and reflux production with minimum pressure differential between the stages of rectification and also to decrease the irreversibility of the overall fractionation process thereby obtaining the desired separation with the high pressure stage operating under substantially reduced pressure, as compared to conventional cycles. In particular, in accordance with the above-mentioned Gaumer application, reboil for the low pressure fractionating zone is obtained by establishing heat interchange between liquid component collecting in the low pressure fractionating zone and relatively high pressure gaseous material comprising components of the gaseous mixture undergoing separation. This heat interchange results in such vaporization of the liquid component to provide the required reboil for the low pressure fractionating zone and at least partial liquefaction of the gaseous material which is introduced into the high pressure fractionating zone in such a manner as to reduce the irreversibility of the fractionation process occurring therein. The Gaumer application also provides, in combination with the foregoing heat interchange, the establishing of a second and separate heat interchange between gaseous fraction collecting in the high pressure fractionating zone and relatively low pressure liquid material including components of the gaseous mixture undergoing separation. The second heat interchange effects liquefaction of the gaseous fraction to provide reflux for both the high pressure fractionating zone and the low pressure fractionating zone and also effects at least partial vaporization of the liquid material which is introduced into the low pressure fractionating zone in such a manner as to decrease the irreversibility of the fractionation process occurring therein. The gaseous material may comprise gaseous mixture prior to introduction into the fractionating operation or gaseous material withdrawn from the high pressure fractionating zone, and the liquid material may comprise liquid formed in the low pressure fractionating zone. Also, part of the gaseous material liquefied upon the heat interchange with liquid component may be introduced into the low pressure fractionating zone as feed to further improve efficiency of the fractionation process.

The present invention comprises a novel method and apparatus for separating gaseous mixtures which comprises an improvement on the invention disclosed in the copending Gaumer application and makes it possible to obtain the desired separation with the high pressure stage operating under further reduced pressure, as compared to conventional cycles.

According to the present invention further reduction in the required pressure of the high pressure fractionating zone of a two-stage fractionating cycle, with a concomitant reduction in power requirement, is obtained by establishing heat interchange between gaseous material, which may comprise the feed mixture, and liquid component collecting in the low pressure fractionating zone, with the liquid component being under different pressure.

The foregoing and other objects and features of the present invention will be more fully understood from the following detailed description considered in connection with the accompanying drawings which disclose two embodiments of the invention. It is to be expressly understood however that the drawings are designed for purposes of illustration only and not as a definition of the limits of the invention, reference for the latter purpose being had to the appended claims.

Figure 1:
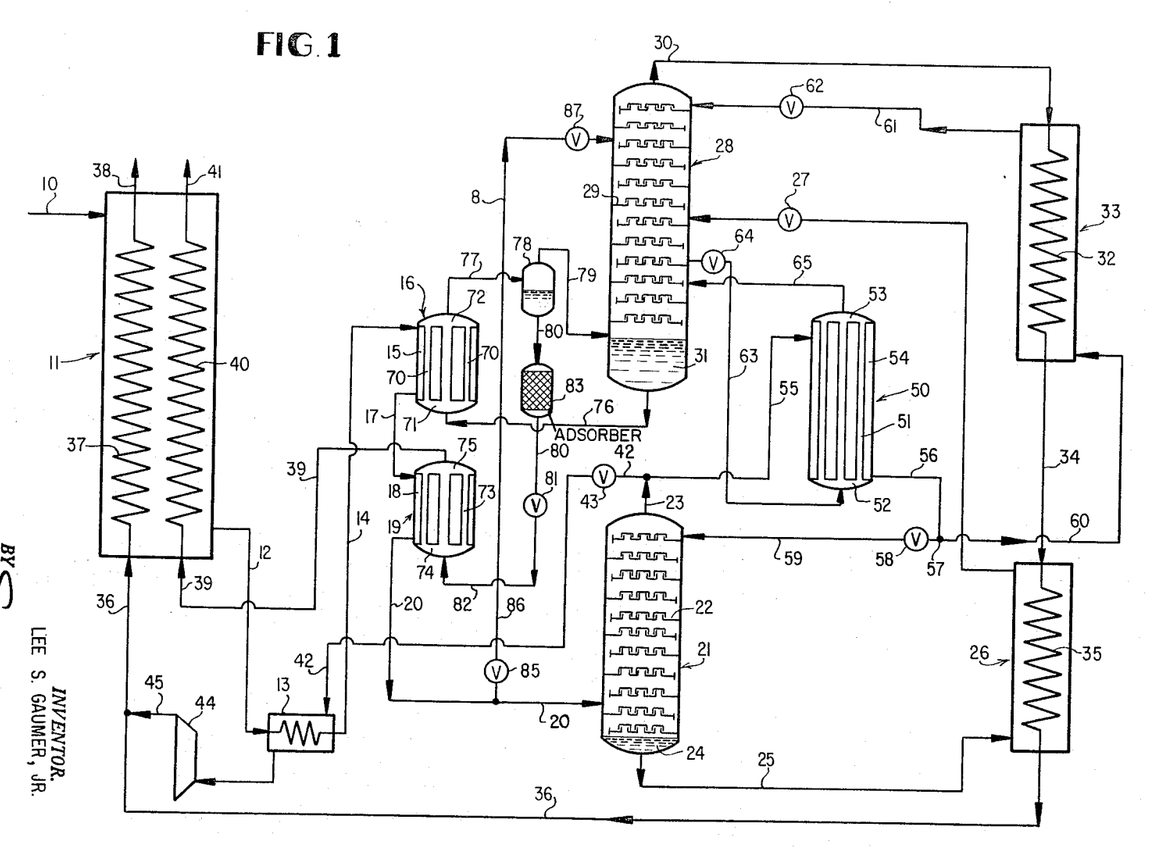
FIGURE 1 is a diagrammatic illustration of a low temperature separation cycle according to one embodiment of the present invention.

With reference more particularly to FIGURE 1 of the drawings, a cycle embodying the principles of the present invention is disclosed therein for the separation of air into oxygen and nitrogen components. Although the present invention is disclosed and described in the environment of air separation, it is to be expressly understood that the principles of the present invention are not limited to air separation cycles but may be employed in the low temperature separation of other gaseous mixtures. As shown, atmospheric air, previously treated to remove moisture and carbon dioxode and compressed to a superatmospheric pressure, enters the cycle through a conduit 10 and is conducted thereby to the shell side of a heat exchange device 11 wherein the air flows in counter-current heat exchange effecting relation with oxygen and nitrogen components, as described below, and is thereby cooled to a relatively low temperature which may approach saturation temperature of air at the existing pressure. The cooled air is withdrawn from the heat exchange device through conduit 12, passed through heat exchanger 13, the purpose of which is described below, and conducted by conduit 14 to the shell side 15 of heat exchange device 16. From the heat exchange device 16 the air is passed through conduit 17 to the shell side 18 of a heat exchange device 19 and from the latter heat exchange device through conduit 20 to a high pressure fractionating column 21. The purpose of the heat exchange devices 15 and 19 will be described below.

The high pressure column 21 may be of conventional construction including means for establishing intimate contact between upwardly flowing vapor and downwardly flowing liquid, such as a series of fractionating plates 22 provided with bubble caps as shown. The air undergoes preliminary separation in the high pressure column producing gaseous high boiling point fraction, that is, substantially pure nitrogen, which collects at the upper end of the column and is withdrawn through conduit 23, and liquid low boiling point fraction, i.e., crude oxygen, which collects in a pool 24 in the bottom of the column. Crude oxygen is withdrawn from the high pressure column by a conduit 25 and after flowing through subcooler 26 and expansion in valve 27 is introduced at an intermediate feed point in a low pressure fractionating column 28. The low pressure column 28 may also be of conventional construction and provided with suitable liquid-vapor contact means such as fractionating plates 29 of the bubble cap type. In the low pressure column, the separation of air is completed with nitrogen component in gaseous phase collecting at the upper end of the column and being withdrawn therefrom through conduit 30 and oxygen component collecting in liquid phase in a pool 31 formed in the base of the column.

Gaseous nitrogen component is conducted by the conduit 30 through passageway 32 of the subcooler 33 and then by conduit 34 through passageway 35 of the subcooler 26. The gaseous nitrogen component then flows through conduit 36 to passageway 37 of the heat exchange device 11 for countercurrent heat exchange effecting relation with the incoming air as described above, the gaseous nitrogen component leaving the heat exchange device 11 through a conduit 38 at substantially ambient temperature. As will be described in detail below, oxygen component in gaseous phase is passed by way of a conduit 39 for flow through passageway 40 of the heat exchange device 11 in countercurrent heat exchange effecting relation with the air feed and the gaseous oxygen leaves the heat exchange device 11 through conduit 41 also at substantially ambient temperature. Refrigeration for the cycle may be obtained by expansion with work of a portion of the high pressure nitrogen gas withdrawn from the high pressure column through the conduit 23. As shown, a conduit 42, having a control valve 43, conducts a portion of the high pressure nitrogen gas for flow through the heat exchange device 13 and then to an expansion engine 44 and effluent of the expansion engine is conducted by conduit 45 and merged with the gaseous nitrogen product flowing in the conduit 36 to the heat exchange device 11. The heat exchange device 13 functions to warm the high pressure nitrogen gas so that liquid is not formed during the expansion process.

As discussed above, the aforementioned Gaumer application provides a low temperature separation cycle in which energy losses due to irreversibility are substantially reduced by the combination of heat exchange steps uniquely related to a fractionation process taking place in a high pressure zone and a relatively low pressure zone; the heat exchange steps being considered as separate condensing-evaporating steps both of which are associated with each of the fractionating zones. The first condensing-evaporating step comprises (a) establishing heat exchange between liquid component of the low pressure fractionating zone and gaseous material under relatively high pressure and including components of the gaseous mixture undergoing separation to effect vaporization of liquid component and at least partial liquefaction of the gaseous material, (b) utilization of vaporized liquid component to provide reboil for the low pressure fractionating zone and (c) utilization of liquefied gaseous material as downwardly flowing liquid in the high pressure fractionating zone, while the second condensing-evaporating step comprises (a) establishing heat exchange between gaseous low boiling point fraction of the high pressure fractionating zone and liquid material under relatively low pressure and including components of the gaseous mixture to effect liquefaction of gaseous low boiling point fraction and vaporization of the liquid material, and (b) utilization of vaporized liquid material as upwardly flowing vapor in the fractionating zone. As shown in the drawing, the second condensing-evaporating step is accomplished by utilization of an outside reboiler 50 which may comprise a two-pass heat exchanger of conventional construction with one pass formed by a plurality of vertically disposed tubes 51 communicating with a lower chamber 52 and an upper chamber 53 and with the second pass comprising shell space 54 surrounding the tubes. The shell side or chamber 54 of the reboiler 50 which may be considered as the nitrogen condenser, is supplied at its upper end with high pressure gaseous nitrogen from the high pressure column 21 through a conduit 55 connected to the conduit 23. The high pressure nitrogen gas, liquefied in the reboiler 50 as described below, is withdrawn by way of conduit 56 and divided at point 57 with one portion, as determined by control valve 58, being conducted by conduit 59 to the top of the high pressure column 21 and there introduced as reflux, while the remaining portion is conducted by conduit 60, passed through the shell side of subcooler 33 and then through conduit 61 and expansion valve 62 for introduction into the top of the low pressure column 28 as reflux. Liquefaction of high pressure gaseous nitrogen fed to the reboiler 50 is accomplished by passing liquid material withdrawn from the low pressure column 28 at a level below the feed point of the liquid crude oxygen and above the pool of liquid oxygen 31 by means of a conduit 63 communicating with the chamber 52 of the reboiler, a control valve 64 being provided in the conduit 63. Such liquid material is vaporized in the reboiler 50 while effecting liquefaction of high pressure nitrogen gas and the vaporized material flows from the upper chamber 53 and through conduit 65 into the low pressure column at a level below the conduit 63 and above the pool 31.

As mentioned above, it is an object of the present invention to provide a novel method of and apparatus for separating gaseous mixtures which makes it possible to achieve the desired separation with the high pressure stage operated under reduced pressure as compared to the methods and apparatus disclosed in the above-mentioned copending Gaumer application. This is accomplished by the provision of a novel arrangement for establishing the first condensing-evaporating step of the copending Gaumer application described above. In accordance with the present invention, vaporization of high boiling point liquid component of the low pressure fractionating zone is accomplished by establishing heat interchange between relatively warm gaseous material under relatively high pressure, which may comprise the feed mixture, and high boiling point liquid component in a plurality of stages of heat interchange in which the high boiling point liquid component is under different pressures. The plural stages of heat interchange may be accomplished by employing a plurality of two-pass heat exchange devices, such as the heat exchange devices 16 and 19. The first pass of the heat exchange device 16 is formed by a plurality of tubes 70 communicating with a lower chamber 71 and an upper chamber 72 and the second pass comprises the shell space 15. In the heat exchange device 19 tubes 73 communicating with lower chamber 74 and upper chamber 75 form the first pass and the second pass comprises the shell space 18. As described above, the gaseous mixture serially flows through the shell spaces 15 and 18 in its passage to the high pressure column 21.

The heat exchange device 16 receives liquid high boiling point oxygen component through a conduit 76 in liquid communication with the pool 31 and the chamber 71. The liquid oxygen is partially vaporized upon flowing through the tubes 70 and the high boiling point oxygen component is conducted from the chamber 72 through a conduit 77 to a phase separator 78. The vaporized portion of the oxygen component is withdrawn from the phase separator 78 and returned through conduit 79 to the low pressure column 28 above the pool 31 to provide reboil for the low pressure column, while the liquid portion is withdrawn from the phase separator 78 through conduit 80, expanded in valve 81 to a lower pressure, and then conducted by conduit 82 to the chamber 74 of the heat exchange device 19. The expanded oxygen component is substantially completely vaporized upon flowing through the tubes 73 and gaseous oxygen collects in the chamber 75 and flows from the latter chamber to the conduit 39 and hence from the system as discussed above. A vessel 83 containing a suitable absorbent for removing hydrocarbons may be included in the conduit 80 as shown.

The gaseous mixture upon flowing through the shell spaces 15 and 18 of the heat exchange devices 16 and 19 in heat exchange effecting relation with the oxygen component is further cooled and at least partly liquefied and, as described above, is conducted through the conduit 20 and introduced into the high pressure column 21. If desired, a portion of the gaseous mixture, as determined by a control valve 85, may be passed through a conduit 86 and expansion valve 87 and introduced into the low pressure column 28 as feed.

The feature of passing a stream of gaseous mixture in heat exchange effecting relation with liquid oxygen at the pressure of the low pressure column and then in heat exchange effecting relation with liquid oxygen expanded to a pressure lower than the pressure existing in the low pressure column makes it possible to utilize gaseous feed mixture under reduced pressure, as compared to the pressure requirements of the aforementioned copending Gaumer application, and effect vaporization of liquid oxygen to provide reboil for the low pressure column and also to vaporize liquid oxygen as product. The high pressure column is operated under a corresponding reduced pressure with nitrogen gas from the latter column being liquefied in the reboiler 50 to provide reflux for the high pressure column and the low pressure column upon heat exchange with crude oxygen liquid withdrawn from the low pressure column at the appropriate temperature level. The reduced pressure of the air feed decreases the power requirements of the system while retaining the reduction in power achieved by the novel feature of the copending Gaumer application.

Due to the pressure drop of the low pressure column 28 and of the conduits and the heat exchange devices forming the circuit for the outwardly flowing products it is necessary to operate the column at a pressure substantially greater than atmospheric pressure. The quantity of liquid oxygen vaporized in the heat exchange device, or first stage reboiler, while under a pressure as existing in the low pressure column, is preferably just sufficient to meet the reboil requirements of the low pressure column. The resistance to outward flow of oxygen product does not include the pressure drop of the low pressure column and hence the portion of the liquid oxygen which is vaporized as product need only be under a pressure a few pounds higher than atmospheric pressure. In accordance with the present invention the portion of liquid oxygen to be delivered in gaseous phase is passed in heat interchange with the feed mixture while under the lowest possible pressure. Such pressure will be determined by the pressure drop of the oxygen product withdrawal circuit of the system which may vary as between plants, for example, the use of regenerators may require or permit a different pressure than the minimum pressure required in a system employing recuperative type heat exchange devices.

Although the cycle of FIGURE 1 discloses a system in which the oxygen component is withdrawn totally in vapor phase it is to be expressly understood that the present invention may be employed in systems in which a part of the oxygen or high boiling point component is delivered in liquid phase. In such a system the quantity of liquid oxygen vaporized in the two reboiler stages, i.e., the heat exchange devices 16 and 19, would be equal to the quantity of liquid oxygen required to be vaporized to satisfy the reboil requirements of the low pressure cycle and to provide the portion of the oxygen component delivered in gaseous phase.

As an operational example of the cycle shown in FIGURE 1, air under a pressure of about 58 p.s.i.a. enters the cycle through conduit 10 and leaves the heat exchanger 11 or the heat exchange device 13 at or close to saturation temperature under the existing pressure such as about −288° F. Based on 100 mols of air entering the cycle in a given period of time, 100 mols of air are conducted by conduit 14 for flow through the heat exchange device 16 in heat interchange with about 32 mols of liquid oxygen withdrawn from the low pressure column 28 by conduit 76; the liquid oxygen being under a pressure of about 22 p.s.i.a. and of about 95% purity. Such heat interchange effects vaporization of about 12 mols of the liquid oxygen and partial liquefication of the air. The 12 mols of oxygen vapor are withdrawn from the phase separator 78 and returned to the low pressure column 28 to provide reboil while the remaining 20 mols of liquid oxygen are passed through adsorber 83, where hydrocarbon impurities are removed, expanded in valve 81 to about 16 p.s.i.a. and then passed by conduit 82 to the tube side of the heat exchange device 19. The 100 mols of air which has been partly liquefied upon flow through the heat exchange device 16 are conducted by conduit 17 for flow through the shell side of the heat exchange device 19 in heat interchange with the 22 mols of liquid oxygen under reduced presure. This heat interchange effects vaporization of the 22 mols of oxygen and cools and further liquefies the 100 mols of air. The 20 mols of gaseous oxygen flows through the conduit 39 and thence from the system as oxygen product and the 100 mols of partly liquefied air passes through conduit 20 to the high pressure column 22. The air feed to the column comprises about 35%–40% liquid and is at a temperature of about −293° F. and may be introduced into the high pressure column at a level where the liquid in the column is of corresponding composition.

About 69 mols of high pressure nitrogen gas is withdrawn from the high pressure column through the conduit 23 and of this quantity about 12 mols pass through conduit 42 to the expansion engine 44 and about 57 mols flow to the reboiler 50. The nitrogen gas is liquefied in the reboiler 50 and such liquefied nitrogen is divided for flow through conduits 59 and 60 to provide reflux for the high pressure and low pressure columns. About 53 mols of liquid material, comprising about 85% oxygen and having a temperature of about −298° F., is withdrawn from the low pressure column 28 through conduit 63 and conducted to the reboiler 50. Such liquid material is vaporized while effecting liquefication of the high pressure nitrogen gas, and the vaporized liquid material at a temperature of about −292° F. returns through conduit 65 to the low pressure column at a level in the low pressure column where the vapor is of corresponding composition. The crude oxygen in pool 24 has a composition of about 34% oxygen and is at a temperature of about −286° F. and is cooled to about −290° F. upon flowing through the subcooler 26 and after expansion in valve 27 to about 22 p.s.i.a. is introduced into the low pressure column at a lower temperature. The reflux for the low pressure column is cooled to about −312° F. upon flowing through the subcooler 33 prior to expansion in the valve 62 to a lower presure and temperature. The nitrogen gas withdrawn from the low pressure column 28 is at about −315° F. and such gas is warmed to about −291° F. upon flowing through subcooler 33 and then to about −290° F. upon flowing through subcooler 26.

When a portion of the air liquefied in the heat exchange devices 16 and 19 is used as feed for the low pressure column, the valve 85 may be opened and adjusted so that about one-half of the available liquid is fed through conduit 20 to the high pressure column and the other half fed through conduit 86 and expansion valve 87 to the low pressure column at a level in which the column liquid is of corresponding composition. This feature of the invention makes it possible to achieve a more efficient distribution of trays in the low pressure column and it is to be understood the distribution of the available liquid could be varied from the foregoing example.

A conventional two-stage fractionating column capable of producing oxygen product of 95% to 96% purity would require the air entering the cycle to be compressed to about 90 p.s.i.a., and by employing the principles disclosed in the copending Gaumer application the pressure of the air feed may be reduced to about 69 p.s.i.a. It is thus seen that utilization of the principles of the present invention results in a substantial decrease in the work of compression required to effect the separation as compared to the prior art and also as compared to the copending Gaumer application but to a lesser degree. When considering the production of oxygen product of 95% to 96% purity on a tonnage basis, such as the order of 500 tons per day, the magnitude of the advantages obtained from the present invention become manifest.

Figure 2:
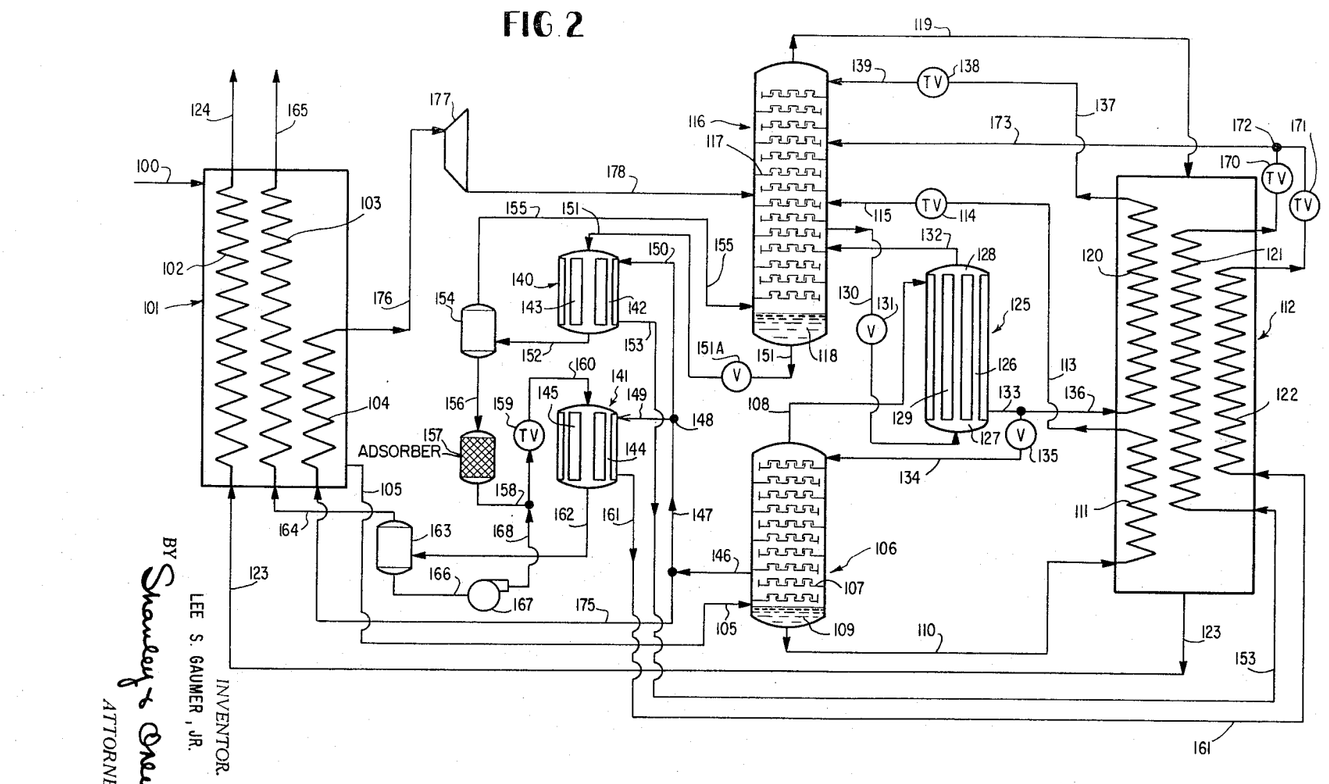
FIGURE 2 is a diagrammatic illustration of a low temperature separation cycle in accordance with another embodiment of the present invention.

In the embodiment of the invention shown in FIGURE 2 of the drawings, gaseous mixture to be separated, such as atmospheric air previously treated to remove carbon dioxide and moisture, enters the cycle through conduit 100 and flows through the shell side of heat exchange device 101 provided with a nitrogen passageway 102, an oxygen passageway 103 and a reheat passageway 104. The air leaves the cold end of the heat exchanger through conduit 105 at or close to saturation temperature at the existing pressure, for example −288° F., and is conducted by the conduit 105 under a pressure of about 58 p.s.i.a. to a high pressure fractionating column 106 provided with liquid vapor contact means such as a plurality of bubble cap type fractionating plates 107 wherein the air undergoes preliminary separation into gaseous low boiling point fraction withdrawn from the top of the column through conduit 108 and liquid high boiling point fraction, namely crude oxygen, collecting in a pool 109 in the base of the fractionating column. Liquid crude oxygen at a temperature of about −285.5° F. is withdrawn from the pool 109 through conduit 110, subcooled upon flowing through passageway 111 of heat exchange device 112 in countercurrent heat exchange with cold nitrogen gas as described below, passed by conduit 113 to expansion valve 114, and then introduced at a pressure of about 21 p.s.i.a. and a temperature of about −306° F. by conduit 115 into a low pressure fractionating column 116 provided with a plurality of fractionating trays 117. The separation is continued in the low pressure fractionating column 116 producing liquid high boiling point component, namely liquid oxygen, collecting in the pool 118 at the base of the low pressure column and gaseous low boiling point component, namely nitrogen, which collects in the top of the column and is removed therefrom through conduit 119. The conduit 119 conducts the cold nitrogen gas at about −316° F. to the shell side of the heat exchanger 112 for countercurrent flow with the liquid crude oxygen in the passageway 11 and with cold fluids flowing through passageway 120, 121 and 122 described below. The nitrogen gas leaves the warm end of the heat exchanger 112 at about −289.5° F. through conduit 123 and is conducted thereby for flow through the passageway 102 of the heat exchange device 101 in countercurrent heat interchange with the incoming air feed as mentioned above, the nitrogen gas being withdrawn from the warm end of the heat exchange device 101 through conduit 124 at substantially ambient temperature.

A heat exchange device or reboiler 125 is provided to perform the second condensing-evaporating step performed by the heat exchange device 50 of the embodiment shown in FIGURE 1. The heat exchange device 125 may be similar to the heat exchange device 50 and may be connected in a similar manner to the high pressure and low pressure columns. As shown, the heat exchange device 125 includes one pass formed by a plurality of tubes 126 communicating with a lower chamber 127 and an upper chamber 128 and a second pass comprising shell space 129 surrounding the tubes. Liquid material at a temperature of about −299° F. is withdrawn from the low pressure column 116 at a point above the pool 118 and below the conduit 115 and conducted by conduit 130, provided with a control valve 131 to the lower chamber 127. Vaporized liquid material at about −298° F. is withdrawn from the upper chamber 128 through conduit 132 and returned to the low pressure column at a level below the conduit 130. Low boiling point fraction, at about −295.2° F., which is withdrawn from the high pressure column 106 through conduit 108 and passed to the shell space 129 of the heat exchange device 125, is liquefied upon heat interchange with the liquid material and the liquefied low boiling point fraction is withdrawn from the heat exchange device 125 through conduit 133 at about −295.1° F. and divided with one part flowing through a conduit 134, having a control valve 135, to the top of the high pressure column 106 to provide reflux and with the other part being conducted by conduit 136 to the passageway 120 of the heat exchange device 112 wherein the liquid nitrogen is subcooled to about −312° F. and the subcooled liquid nitrogen is conducted by conduit 137 to an expansion valve 138 and then introduced by conduit 139 into the top of the low pressure column 116 as reflux at about −316° F. and 19 p.s.i.a.

Heat exchange devices 140 and 141 are provided to effect the first condensing-evaporating step accomplished by the heat exchange devices 16 and 19 of the FIGURE 1 embodiment and may be similar to the latter heat exchange devices. As shown, the heat exchange device 140 includes a plurality of tubes 142 in a shell space 143 and the heat exchange device 141 includes a plurality of tubes 144 within a shell space 145. However, the heat exchange devices 140 and 141 are connected differently in the cycle and provide different functions which result in improvements in operation of the process. Gaseous material at about −288° F. is withdrawn from the high presure column 106 a few trays above the pool 109 through a conduit 146 and conducted by conduit 147 to point 148 where the gaseous material is divided with one portion flowing through conduit 149 to the shell space 145 of heat exchange device 141 and with the other portion flowing through conduit 142 to the shell space 143 of the heat exchange device 140. Liquid high boiling point product, namely oxygen, at about 21 p.s.i.a. and −292.8° F., is withdrawn from the pool 118 of the low pressure column 116 through conduit 151, provided with a control valve 152, and conducted to the heat exchange device 140 where the liquid oxygen is partly vaporized upon flowing through the tubes 142 in heat interchange with the gaseous material introduced into the shell side by conduit 150. The heat interchange effects total liquefication of the gaseous material which is withdrawn from the heat exchange device at about −292.2° F. through conduit 153 while oxygen, in liquid and vapor phases, is withdrawn from the heat exchange device 140 through conduit 152 at about −292.4° F. and passed to a phase separator 154. Vaporized oxygen is withdrawn from the phase separator 154 and conducted by conduit 155 to the low pressure column 116 above the pool 118 to provide reboil. Liquid oxygen, at about −292.4° F., is withdrawn from the phase separator by conduit 156 and passed through an adsorber 157 to remove hydrocarbons or other impurities from the liquid oxygen; the adsorber may be provided in duplicate and so arranged that one is onstream while the other is being purged. After flowing through the adsorber 157, the liquid oxygen is conducted by conduit 158 to an expansion valve 159 by which the pressure of the liquid oxygen is reduced to a value, such as 16 p.s.i.a. for example, just sufficient to insure outward flow of product from the cycle. The expanded liquid oxygen at about −294.2° F. is conducted by conduit 160 for flow through the tubes 144 of the heat exchange device 141 in heat interchange with the gaseous material fed to the shell side of the heat exchanger through conduit 149. The latter heat interchange effects complete liquefication of the gaseous material which is withdrawn from the exchanger through conduit 161 at about −292.2° F. and vaporization of a quantity of the liquid oxygen corresponding to the mass of gaseous oxygen product of the process. For reasons discussed below, the mass of liquid oxygen entering the heat exchange device 141 is preferably greater than the mass of the gaseous oxygen product and accordingly the oxygen withdrawn from the heat exchange device by conduit 162, at about −293° F. is, to a small extent, in liquid phase. The conduit 162 is connected to a phase separator 163 from which the vaporized oxygen at about −293° F. is withdrawn by conduit 164 and passed to the passageway 103 of the heat exchange device 101 for countercurrent heat interchange with the incoming air feed as described above, the gaseous oxygen product being withdrawn through conduit 165 at substantially ambient temperature. The liquid portion of the oxygen entering the phase separator 163 is withdrawn therefrom by conduit 166 and fed to a small compressor 167 where its pressure is increased to the pressure of the liquid oxygen upstream of the expansion valve, that is, 21 p.s.i.a., and the compressed liquid oxygen is conducted by and merged with the liquid oxygen in conduit 158 prior to expansion in the valve 159.

The liquefied gaseous material withdrawn from the heat exchange device 140 is conducted by the conduit 153 to passageway 121 of the heat exchange device 112 to effect subcooling of the liquid material by heat interchange with cold nitrogen gas and the subcooled liquid material is expanded in valve 170 to the pressure existing in the low pressure column 116 and thereby further cooled to about −303° F. Also, the liquefied gaseous material withdrawn from the heat exchange device 141 is conducted by conduit 161 for flow through passageway 122 of the heat exchange device 112 and the subcooled liquid material is expanded in valve 171 to the pressure existing in the low pressure column 116 and further cooled to about −303° F. The streams of expanded liquid material from the valves 170 and 171 are merged at point 172 and introduced by way of conduit 173 into the low pressure column 116 at a level of substantially similar composition above the conduit 115 and below the conduit 139.

Refrigeration for the cycle may be obtained by expanding with work a high pressure fluid of the cycle such as a portion of the gaseous material withdrawn from the high pressure column 106 through conduit 146. As shown, such gaseous material at about −288° F. is conducted by conduit 175 for flow through the reheat passageway 104 of the heat exchanger 101. The gaseous material is warmed to about −230° F. upon flowing through the reheat passageway, and at that temperature is fed by conduit 176 to a work expansion engine 177. In the engine 177, the gaseous material is expanded to about 21 p.s.i.a. and thereby cooled to about −275° F., the expansion engine effluent being conducted by conduit 178 to the low pressure column 116.

The purity of components of gaseous mixtures separated in fractionating operations and hence the percentage of the components of the gaseous mixtures that are recovered depends in large part on the reflux ratios prevailing in the region of the fractionating zones where the separation takes place. In the low pressure stage of a conventional two-stage fractionating column the reflux ratio in the bottom portion is greater than unity whereas in the upper portion the reflux ratio is less than unity; and in both portions the efficiency of the separation increases as the reflux ratios approach unity. Also, in order to obtain maximum fractionating efficiency, that is, the highest recovery of components of highest purity, it is necessary to maintain substantially constant the optimum reflux ratios which can only be accomplished by maintaining substantially constant the mass of liquid and vapor streams fed to and removed from the column.

The embodiment of the invention shown in FIGURE 2 makes it possible to accurately establish and maintain optimum reflux ratios in the low pressure fractionating column and to improve the reflux ratio in the upper portion of the low pressure column while at the same time obtaining the advantages of the embodiment of FIGURE 1, that is, a reduction in the power requirements of the cycle by heat interchange with liquid high boiling point component, for example liquid oxygen, under different pressures.

The low pressure fractionating column 116 is designed to operate with an optimum reflux ratio in its bottom portion and the fluid streams entering and leaving the column which effect the reflux ratio must be established and maintained substantially constant. Thus, a specific mass of liquid oxygen need be vaporized in heat exchanger 140 to provide reboil for the low pressure column. Since the temperature, pressure and composition of the gaseous material fed to heat exchange device 140 by way of the conduit 150 are known from the overall design of the cycle, it is possible to determine the mass of such the gaseous material that need be passed in heat interchange with liquid oxygen withdrawn from the low pressure column to provide the required oxygen vapor for reboil and a heat exchange device capable of effecting that result may be designed. However, from a practical viewpoint, it is not possible to fabricate a heat exchange device that will accurately perform a desired heat exchange function and it is usually necessary to adjust the rates of flow of fluids flowing through the passageways of the heat exchange device or to change the pressures and temperatures or perhaps the compositions in order to achieve the desired result. In the case of the heat exchange device 140, it would not be possible to adjust the heat interchange efficiency by employing any one or more of the foregoing variants without disturbing the designed operating conditions of the fractionating column. For example, any variation of the mass of the gaseous material in conduit 150 would upset operation of the low pressure column. The present invention makes it possible to adjust the efficiency of the heat exchange device 140 to establish and maintain the precise mass of oxygen vapor reboil required for an optimum reflux while at the same time effecting complete liquefaction of the gaseous material without in any way adversely affecting column operation. The foregoing is achieved by designing the heat exchange device 140 to be slightly "oversize," that is so that a given mass of gaseous material flowing through the shell space 143 could result in vaporization of a mass of liquid oxygen in excess of the required reboil, and by controlling the efficiency of the heat exchange device 140 by decreasing the effective area of the heat exchange surfaces so as to effect vaporization of a mass of liquid oxygen corresponding precisely to the reboil requirements. The effective area of the heat exchange surfaces is varied selectively by controlling the level of liquefied gaseous material collecting in the shell space 143 and this may be accomplished by momentarily increasing or decreasing, as the case may be, the rate of flow of liquefied gaseous material leaving the heat exchange device through conduit 153 by means of the expansion valve 170.

A similar control problem exists with respect to the heat exchange device 141 which functions to effect vaporization of a mass of liquid oxygen as required to provide the oxygen product of the cycle. As in the case of the heat exchange device 140, the heat exchange device 141 is designed slightly "oversize" and the level of liquefied gaseous material in the shell space 145 is adjusted, by operation of the expansion valve 171 so that the effective area of the heat exchange surfaces are such as to effect vaporization of the required mass of liquid oxygen.

In order to obtain efficient heat interchange between fluids in vapor phase and in liquid phase, it is desirable to maintain continuously wet with the liquid material the total area of the heat exchange surfaces in physical contact with the fluid in liquid phase. In order to achieve this result the mass of liquid oxygen flowing to the heat exchange device 141 by way of the conduit 160 is greater than the mass of liquid oxygen vaporized in the heat exchange device 141. The excess or unvaporized liquid oxygen is separated in the phase separator 163, compressed by the compressor 167 to the pre-expansion pressure, and merged with the liquid oxygen to be vaporized and recycled through the heat exchange device 145. The excess liquid oxygen recycled through the heat exchange device 141 is of sufficient mass to insure maintaining the heat exchange surfaces continuously wet. However, during certain phases of operation, the mass of the recycled liquid oxygen may exceed this value. For example, during initial starting of the cycle, it may be advantageous to recycle a great mass and after the heat exchange device 141 is balanced to reduce the mass to the minimum value.

The liquefied gaseous material withdrawn from the heat exchange devices 140 and 141 by way of conduits 153 and 161, respectively, comprises gaseous material substantially of the composition of the feed mixture and the introduction of the liquefied gaseous material into the low pressure column through conduit 173 improves the reflux ratio and makes it possible to increase oxygen recovery. Except for the momentary period of adjustment of the liquid level of the heat exchange devices 140 and 141, the mass of liquefied gaseous material fed to the low pressure fractionating column 116 is constant thus maintaining the optimum reflux ratio. Accordingly, the feature provided by the present invention of controlling the effective area of the heat exchange surfaces of heat exchange devices 140 and 141 makes it possible to operate the cycle at optimum efficiency.

Based on the pressure and temperature examples given above the embodiment of the invention shown in FIGURE 2 is capable of producing about 20.5 mols of oxygen of 95% purity. Considering 100 mols of air entering the cycle through conduit 100, about 47 mols of gaseous material is withdrawn from the high pressure column through conduit 146 with about 8 mols being fed to the expansion engine 177, about 25 mols being fed to the heat exchange device 145 and about 14 mols being fed to the heat exchange device 140. The 14 mols of gaseous material is passed in heat interchange with about 32 mols of liquid oxygen to effect vaporization of about 11.5 mols which are returned to the low pressure column as reflux and the remaining 20.5 mols of liquid oxygen is vaporized in heat exchange device 141 and delivered from the cycle as oxygen product. The excess liquid oxygen recycled through the heat exchange device 141 and compressor 167 may comprise, for example, about 3 mols. The 14 mols of liquefied gaseous material from the heat exchange device 140 and the 25 mols of liquefied gaseous material from the heat exchange device 141 are combined in conduit 173 to provide about 39 mols of liquid material which is introduced into the low pressure column as reflux and the nitrogen gas withdrawn from the top of the low pressure column comprises about 79.5 mols.

It is to be expressly understood that the gaseous material fed to the heat exchange devices 16 and 19 of the FIGURE 1 embodiment and fed to the heat exchange devices 140 and 141 of the FIGURE 2 embodiment may comprise cooled gaseous mixture, such as air, leaving the cold end of the heat exchange device 11 of FIGURE 1 or 101 of FIGURE 2, in accordance with the arrangement shown in FIGURE 1, or may consist of gaseous material withdrawn from the bottom of the high pressure column a few trays above the pool of liquid crude oxygen as shown in the embodiment of FIGURE 2. In a variant of the embodiment of FIGURE 1 with gaseous material being withdrawn from the high pressure column 21 and passed through the heat exchange devices 16 and 19, the mass of the gaseous material may correspond to the mass of the gaseous mixture entering the cycle for separation. Accordingly, the term "gaseous material" as used in this description and in the appended claims encompasses cooled feed mixture and gaseous material withdrawn from the high pressure column. Furthermore, the system for obtaining refrigeration in the embodiments of FIGURE 1 and FIGURE 2 may be used in the other embodiment with high pressure nitrogen gas or gaseous material from the high pressure column or another high pressure fluid of the cycle, such as gaseous mixture which could be withdrawn from a medial point of the main heat exchanger, being fed to the work expansion engine.

Although the present invention is disclosed and described in the environment of air separation into oxygen and nitrogen components it is to be expressly understood, as mentioned above, that the principles of the present invention may be employed in connection with low temperature separation of other gaseous mixtures in two stages of fractionation under different pressures in which preliminary separation takes place in the higher pressure stage producing gaseous low boiling point fraction and liquid high boiling point fraction and in which the separation is continued in the lower pressure stage producing gaseous low boiling point component and liquid high boiling point component. Furthermore, the present invention is applicable to cycles for producing products in gaseous phase, as illustrated, as well as to cycles in which product is delivered in liquid phase and cycles in which a product is pumped in liquid phase to relatively high pressure and upon vaporization in heat exchange with the gaseous feed mixture is delivered from the cycle in gaseous phase under superatmospheric pressure. Moreover, the principles of the present invention are applicable to cycles in which the feed mixture is delivered to the cycle under different pressures, one of which may be greater than the pressure existing in the high pressure column. In such cycles, the principles of the present invention make it possible to reduce substantially the pressure of that portion of the feed mixture under relatively low pressure which usually comprises a major portion of the total feed mixture. In addition, it is to be expressly understood that the principles of the present invention do not depend upon and are unrelated to certain features or components shown in FIGURES 1 and 2. For example, instead of previously treating air to remove carbon dioxide and moisture, a switching type of heat exchange means may be provided in place of the heat exchanger 11 or 101 and such switching heat exchange means may be provided with any one of several unbalancing schemes known to the art, or the carbon dioxide and moisture may be removed by an adsorption process.

It is also to be expressly understood that the principles of the present invention may be practiced without employing outside reboilers for the oxygen evaporator represented by the heat exchange device 16 or 140 and the nitrogen condenser. In particular, in place of the heat exchange device 16 or 140, a boiling coil could be placed in the bottom of the low pressure column in heat interchange with liquid oxygen and connected in series with conduits 14 and 17 of FIGURE 1 and conduits 150 and 152 of FIGURE 2. Also, the heat exchange device 50 of FIGURE 1 and 125 of FIGURE 2 could be replaced by (a) providing a boiling coil in the low pressure column intermediate the feed point and the pool of liquid oxygen and connected in series with conduits 55 and 56 of FIGURE 1 and conduits 108 and 133 of FIGURE 2, or (b) by providing a condensing coil within the upper end of the high pressure column in series relation with the conduits 63 and 65 of FIGURE 1 and conduits 130 and 132 of FIGURE 2.

It is therefore to be expressly understood that various changes and substitutions may be made in the embodiments of the invention disclosed herein without departing from the spirit of the invention as well understood by those skilled in the art. Reference therefore will be had to the appended claims for definition of limits of the invention.

What is claimed is:

1. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the gaseous low boiling point fraction, performing a first condensing-evaporating step including establishing heat interchange between cool gaseous material under superatmospheric pressure and liquid high boiling point component under a pressure corresponding to the pressure of the second fractionating zone and establishing heat interchange between cool gaseous material under superatmospheric pressure and liquid high boiling point component under a pressure lower than the pressure of the second fractionating zone to further cool the gaseous material and provide vaporized liquid high boiling point component under a pressure corresponding to the pressure of the second fractionating zone and vaporized liquid high boiling point component under a pressure lower than the pressure of the second fractionating zone, the first condensing-evaporating step including utilization of vaporized liquid high boiling point component under a pressure corresponding to the pressure of the second fractionating zone as reboil for the second fractionating zone, withdrawing as product vaporized liquid high boiling point component under a pressure lower than the pressure of the second fractionating zone, feeding further cooled gaseous material to the fractionating operation, liquefying gaseous low boiling point fraction, and utilizing liquefied low boiling point fraction as reflux for the first and second fractionating zones.

2. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the gaseous low boiling point fraction, establishing heat interchange between liquid high boiling point component and gaseous material to vaporize liquid high boiling point component and further cool the gaseous material, utilizing vaporized liquid high boiling point component as reboil for the second fractionating zone, expanding liquid high boiling point component, establishing heat interchange between expanded liquid high boiling point component and gaseous material to vaporize expanded liquid high boiling point component and further cool the gaseous material, feeding further cooled gaseous material to the fractionating operation, performing a second condensing-evaporating step including establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction and less than the percentage of the high boiling point component of the liquid high boiling point component, and utilizing liquefied low boiling point fraction as reflux for the first and second fractionating zones.

3. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the gaseous low boiling point fraction, establishing heat interchange between liquid high boiling point component and cool gaseous material to partly vaporize liquid high boiling point component and further cool the gaseous material, separating partly vaporized liquid high boiling point component into a liquid portion and a vapor portion, utilizing the vapor portion as reboil for the second fractionating zone.

expanding the liquid portion, establishing heat interchange between expanded liquid portion and cool gaseous material to vaporize expanded liquid portion and further cool the gaseous material, passing vaporized expanded liquid portion in heat interchange with gaseous mixture, feeding further cooled gaseous material to the fractionating operation, performing a second condensing-evaporating step including establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction and less than the percentage of the high boiling point component of the liquid high boiling point component, and utilizing liquefied low boiling point fraction as reflux for the first and second fractionating zones.

4. Method of separating gaseous mixtures as defined in claim 3 in which the liquid portion is passed through an absorbent.

5. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the gaseous low boiling point fraction, passing cold gaseous material serially in heat interchange with liquid high boiling point component under first a pressure corresponding to the pressure of the liquid high boiling point component in the second fractionating zone and with liquid high boiling point component under a second pressure less than the first pressure to vaporize liquid high boiling point component under the first pressure and under the second pressure and further cool the gaseous material, utilizing vaporized liquid high boiling point component under the first pressure as reboil for the second fractionating zone, passing vaporized liquid high boiling point component under the second pressure in heat interchange with gaseous mixture, feeding further cooled gaseous material to at least the first fractionating zone of the fractionating operation, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of the high boiling point component of the liquid high boiling fraction and less than the percentage of the high boiling point component of the liquid high boiling point component, and utilizing liquefied low boiling point fraction as reflux for the first and second fractionating zones.

6. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the gaseous low boiling point fraction, establishing heat interchange between liquid high boiling point component and cool gaseous material to vaporize liquid high boiling point component and further cool the gaseous material, utilizing vaporized liquid high boiling point component as reboil for the second fractionating zone, expanding liquid high boiling point component, establishing heat interchange between expanded liquid high boiling point component and further cooled gaseous material to vaporize expanded liquid high boiling point component and still further cool the gaseous material, passing vaporized expanded liquid high boiling point component in heat interchange with gaseous mixture, feeding still further cooled gaseous material to the fractionating operation, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction and less than the percentage of the high boiling point component of the liquid high boiling point component, and utilizing liquefied low boiling point fraction as reflux for the first and second fractionating zones.

7. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, and greater than the percentage of high boiling point component of the gaseous low boiling point fraction, establishing heat interchange between liquid high boiling point component and cool gaseous material to partly vaporize liquid high boiling point component and further cool the gaseous material, separating partly vaporized liquid high boiling point component into a liquid portion and a vapor portion, utilizing the vapor portion as reboil for the second fractionating zone, expanding the liquid portion, establishing heat interchange between expanded liquid portion and further cool gaseous material to vaporize expanded liquid portion and still further cool the gaseous material, passing vaporized expanded liquid portion in heat interchange with gaseous mixture, feeding further cooled gaseous material to the fractionating operation, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction and less than the percentage of the high boiling point component of the liquid high boiling point component, and utilizing liquefied low boiling point fraction as reflux for the first and second fractionating zones.

8. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the gaseous low boiling point fraction, establishing heat interchange between liquid high boiling point component and cool gaseous material of a mass corresponding to the mass of compressed gaseous mixture to be separated to vaporize liquid high boiling point component and further cool the gaseous material, utilizing vaporized liquid high boiling point component as reboil for the second fractionating zone, expanding liquid high boiling point component, establishing heat interchange between expanded liquid high boiling point component and further cooled gaseous material to vaporize expanded liquid high boiling point component and still further cool the gaseous material, passing vaporized expanded liquid high boiling point component in heat interchange with gaseous mixture, feeding still further cooled gaseous material to the fractionating operation, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and less than the percentage of the high boiling point component of the liquid high boiling point component, and utilizing liquefied low boiling point fraction as reflux for the first and second fractionating zones.

9. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction and greater than the percentage of high boiling point component of the gaseous low boiling point fraction, establishing heat interchange between liquid high boiling point component and cool gaseous material of a mass corresponding to the mass of gaseous mixture to be separated to partly vaporize liquid high boiling point component and further cool the gaseous material, separating partly vaporized liquid high boiling point component into a liquid portion and a vapor portion, utilizing the vapor portion as reboil for the second fractionating zone, expanding the liquid portion, establishing heat interchange between expanded liquid portion and further cool gaseous material to vaporize expanded liquid portion and still further cool the gaseous material, passing vaporized expanded liquid portion in heat interchange with gaseous mixture, feeding further cooled gaseous material to the fractionating operation, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction and less than the percentage of the high boiling point component of the liquid high boiling point component, and utilizing liquefied low boiling point fraction as reflux for the first and second fractionating zones.

10. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, establishing heat interchange between a first part of liquid high boiling point component and a first part of cool gaseous material to vaporize the first part of liquid high boiling point component and liquefy the first part of cool gaseous material, utilizing vaporized first part of liquid high boiling point component as reboil for the second fractionating zone, establishing heat interchange between a second part of liquid high boiling point component and a second part of cool gaseous material to vaporize the second part of liquid high boiling point component and liquefy the second part of cool gaseous material, passing vaporized second part of liquid high boiling point component in heat interchange with gaseous mixture, feeding the liquefied first part and the liquefied second part of cool gaseous material to the second fractionating zone, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and utilizing liquefied low boiling point fraction as reflux for the first and second fractionating zones.

11. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, passing a first part of cold gaseous material in heat interchange with liquid high boiling point component under a first pressure corresponding to the pressure of the liquid high boiling point component in the second fractionating zone to vaporize liquid high boiling point component under the first pressure and liquefy the first part of cold gaseous material, utilizing vaporized liquid high boiling point component under the first pressure as reboil for the second fractionating zone, passing a second part of cold gaseous material in heat interchange with liquid high boiling point component under a second pressure less than the first pressure to vaporize liquid high boiling point component under the second pressure and liquefy the second part of cold gaseous material, passing vaporized high boiling point component under the second pressure in heat interchange with gaseous mixture, passing the first part of liquefied gaseous material and the second part of liquefied gaseous material to the second fractionating zone, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and utilizing liquefied low boiling point fraction as reflux for the first and second fractionating zones.

12. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, establishing heat interchange between liquid high boiling point component and a first part of cool gaseous material to partly vaporize liquid high boiling point component and liquefy the first part of the cool gaseous material, separating partly vaporized liquid high boiling point component into a liquid portion and a vapor portion, utilizing the vapor portion as reboil for the second fractionating zone, expanding the liquid portion, establishing heat interchange between expanded liquid portion and a second part of cool gaseous material to vaporize expanded liquid portion and liquefy the second part of cool gaseous material, passing vaporized expanded liquid portion in heat interchange with gaseous mixture, feeding liquefied first part and liquefied second part of the cool gaseous material to the second fractionating zone, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and utilizing liquefied low boiling point fraction as reflux for the first and second fractionating zones.

13. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, establishing heat interchange between liquid high boiling point component and a first part of cool gaseous material to partly vaporize liquid high boiling point component and liquefy the first part of the cool gaseous material, separating partly vaporized liquid high boiling point component into a liquid portion and a vapor portion, utilizing the vapor portion as reboil for the second fractionating zone, expanding the liquid portion, establishing heat interchange between expanded liquid portion and a second part of cool gaseous material to vaporize expanded liquid portion and liquefy the second part of the cool gaseous material, passing vaporized expanded liquid portion in heat interchange with gaseous mixture, passing liquefied first part of gaseous mixture in heat interchange with gaseous low boiling point component and then expanding the first part, passing liquefied second part of gaseous mixture in heat interchange with gaseous low boiling point component and then expanding the second part, introducing the expanded first part and the expanded second part of gaseous material to the second fractionating zone, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and utilizing liquefied low boiling point fraction as reflux for the first and second fractionating zones.

14. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, establishing heat interchange between liquid high boiling point component and cool gaseous material to vaporize liquid high boiling point component and liquefy the gaseous material, the last-named heat interchange including passing liquid high boiling point component in heat interchange with cool gaseous material in a heat exchange zone, controlling the level of liquefied gaseous material collecting in the heat exchange zone to establish the mass of liquid high boiling point component vaporized in the heat exchange zone, utilizing a part of the vaporized liquid high boiling point component as reboil for the second fractionating zone and passing another part of the vaporized liquid high boiling point component in heat interchange with gaseous mixture, introducing liquefied gaseous material into the second fractionating zone, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and utilizing liquefied low boiling point fraction as reflux for the first and second fractionating zones.

15. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, passing a first part of liquid high boiling point component in heat interchange with a first part of cool gaseous material in a first heat exchange zone to vaporize liquid high boiling point component and liquefy the first part of cool gaseous material, controlling the level of liquefied gaseous material collecting in the first heat exchange zone to establish the mass of liquid high boiling point component vaporized in the first heat exchange zone, utilizing liquid high boiling point component vaporized in the first heat exchange zone as reboil for the second fractionating zone, passing a second part of liquid high boiling point component in heat interchange with a second part of cool gaseous material in a second heat exchange zone to vaporize liquid high boiling point component and liquefy the second part of cool gaseous material, controlling the level of liquefied gaseous material collecting in the second heat exchange zone to establish the mass of liquid high boiling point component vaporized in the second heat exchange zone, passing liquid high boiling point component vaporized in the second heat exchange zone in heat interchange with gaseous mixture, feeding further cooled gaseous material to the fractionating operation, introducing liquefied first part of gaseous material and liquefied second part of gaseous material into the second fractionating zone, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and utilizing liquefied low boiling point fraction as reflux for the first and second fractionating zones.

16. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, passing liquid high boiling point component in heat interchange with a first part of cool gaseous material in a first heat exchange zone to partly vaporize liquid high boiling point component and liquefy the first part of cool gaseous material, controlling the level of liquefied gaseous material collecting in the first heat exchange zone to establish the mass of liquid high boiling point component vaporized in the first heat exchange zone, separating partly vaporized liquid high boiling point component into a liquid portion and a vapor portion, utilizing the vapor portion as reboil for the second fractionating zone, expanding the liquid portion, passing the expanded liquid portion in heat interchange with a second part of cool gaseous material to vaporize expanded liquid portion and liquefy the second part of cool gaseous material, controlling the level of liquefied gaseous material collecting in the second heat exchange zone to establish the mass of expanded liquid portion vaporized in the second heat exchange zone, passing expanded liquid portion vaporized in the second heat exchange zone in heat interchange with gaseous mixture, introducing liquefied gaseous material from the first heat exchange zone and liquefied gaseous material from the second heat exchange zone into the second fractionating zone, establishing heat interchange between gaseous low boiling point fraction and liquid material of the operation to liquefy gaseous low boiling point fraction, the liquid material being under relatively low pressure and including components of the gaseous mixture with the percentage of the high boiling point component being greater than the percentage of high boiling point component of the liquid high boiling point fraction, and utilizing liquefied low boiling point fraction as reflux for the first and second fractionating zones.

17. Method of separating gaseous mixtures as defined in claim 16 in which a quantity of expanded liquid portion in excess of the mass of expanded liquid portion vaporized in the second heat exchange zone is passed through the second heat exchange zone.

References Cited

UNITED STATES PATENTS

| 1,784,120 | 12/1930 | Van Nuys | 62—29 |
| 1,976,336 | 10/1934 | Eichelman | 62—29 |
| 2,360,468 | 10/1944 | Brown | 62—15 X |
| 2,513,306 | 7/1950 | Garbo | 62—29 X |
| 2,537,046 | 1/1951 | Garbo | 62—14 |
| 2,648,205 | 8/1953 | Hufnagel | 62—29 X |
| 2,655,796 | 10/1953 | Rice | 62—29 X |
| 2,664,719 | 1/1954 | Rice | 62—14 X |
| 2,688,238 | 9/1954 | Schilling | 62—31 X |
| 2,823,523 | 2/1958 | Eakin | 62—40 X |
| 2,850,880 | 9/1958 | Jakob | 62—29 |
| 2,873,583 | 2/1959 | Potts | 62—38 X |
| 3,113,854 | 12/1963 | Bernstein | 62—29 X |

NORMAN YUDKOFF, *Primary Examiner.*

J. JOHNSON, V. W. PRETKA, *Assistant Examiners.*